US007324218B2

(12) United States Patent
Stierle et al.

(10) Patent No.: US 7,324,218 B2
(45) Date of Patent: *Jan. 29, 2008

(54) METHOD AND DEVICE FOR DISTANCE MEASUREMENT

(75) Inventors: Joerg Stierle, Waldenbuch (DE); Peter Wolf, Leinfelden-Echterdingen (DE); Gunter Flinspach, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

This patent is subject to a terminal disclaimer.

(21) Appl. No.: 10/503,650

(22) PCT Filed: May 12, 2003

(86) PCT No.: PCT/DE03/01522

§ 371 (c)(1),
(2), (4) Date: Aug. 5, 2004

(87) PCT Pub. No.: WO2004/017022

PCT Pub. Date: Feb. 26, 2004

(65) Prior Publication Data

US 2005/0083512 A1 Apr. 21, 2005

(30) Foreign Application Priority Data

Jul. 19, 2002 (DE) ................. 102 32 878

(51) Int. Cl.
*G01C 3/08* (2006.01)
*G01B 27/40* (2006.01)
(52) U.S. Cl. .................... 356/614; 356/4.01; 356/5.01; 250/201.6; 250/559.22
(58) Field of Classification Search ........ 356/614–625, 356/5.01, 4.01, 5.1, 5.05, 601–602; 250/559.22, 250/559.23, 559.31
See application file for complete search history.

(56) References Cited

U.S. PATENT DOCUMENTS

| 3,644,740 A | * | 2/1972 | Dobratz et al. ......... 250/214 R |
| 4,498,764 A | * | 2/1985 | Bolkow et al. ............ 356/5.06 |
| 4,895,441 A | * | 1/1990 | Allen, Jr. ................... 356/5.09 |

(Continued)

FOREIGN PATENT DOCUMENTS

DE 198 11 550 A1 9/1999

(Continued)

*Primary Examiner*—Sang H. Nguyen
(74) *Attorney, Agent, or Firm*—Michael J. Striker

(57) ABSTRACT

The present invention relates to a device (10) for distance measurement, with at least one transmitting branch (14) with a transmission source (22, 24) for a measurement signal for emitting a modulated measuring beam (16, 26, 36) in the direction of a target object (20), and with a receive branch (18) for the measurement radiation (17, 44) returning from the target object (30), and with a control and evaluation unit (28, 58) for determining the distance of the device (10) to the target object (20) from the measurement radiation returning from the target object (20).

It is proposed according to the invention that the device (10) include means that enable measurement of distances with predetermined measurement uncertainties.

The present invention further relates to a method for distance measurement, with which a measurement of distances with predetermined measurement uncertainties is possible. To ensure a distance measurement in a certain, predetermined measurement time, the value on which a distance measurement is based can be adjusted to the measurement uncertainty, and can be increased incrementally in particular.

23 Claims, 4 Drawing Sheets

U.S. PATENT DOCUMENTS

| | | | |
|---|---|---|---|
| 5,303,020 A * | 4/1994 | Croteau | 356/5.01 |
| 5,489,149 A * | 2/1996 | Akasu | 356/5.01 |
| 5,612,779 A | 3/1997 | Dunne | |
| 5,737,085 A * | 4/1998 | Zollars et al. | 356/623 |
| 5,828,584 A * | 10/1998 | Oda et al. | 702/158 |
| 5,892,576 A * | 4/1999 | Gaechter | 356/5.05 |
| 5,946,081 A | 8/1999 | Chien | |
| 6,115,112 A | 9/2000 | Hertzman | |
| 6,429,941 B1 * | 8/2002 | Kamon et al. | 356/614 |
| 6,515,589 B2 * | 2/2003 | Schneider et al. | 340/630 |
| 6,801,305 B2 * | 10/2004 | Stierle et al. | 356/4.01 |
| 6,806,968 B2 * | 10/2004 | Ruck | 356/623 |
| 6,833,909 B2 * | 12/2004 | Schmidt et al. | 356/4.01 |

FOREIGN PATENT DOCUMENTS

| | | |
|---|---|---|
| EP | 1 022 585 | 7/2000 |
| EP | 0 885 399 B1 | 9/2001 |

* cited by examiner

METHOD AND DEVICE FOR DISTANCE MEASUREMENT

CROSS-REFERENCE

The invention described and claimed hereinbelow is also described in PCT/DE 03/01522, filed on May 12, 2003 and DE 102 32 878. 1, filed Jul. 19, 2002. This German Patent Application, whose subject matter is incorporated here by reference, provides the basis for a claim of priority of invention under 35 U.S.C. 119 (a)-(d).

BACKGROUND OF THE INVENTION

The present invention is directed to a device for distance measurement and/or a method for distance measurement.

Distance measurement devices and, in particular, optical distance measurement devices as such have been known for some time. These devices emit a modulated measuring beam, e.g., a light or laser beam, which is directed to a desired target object, the distance of which to the device is to be determined. A portion of the returning measurement signal that is reflected or scattered by the sighted target object is detected again by the device and used to determine the sought-after distance.

A distinction is made hereby between "phase measurement methods" and pure "transit time methods" for determining the sought-after distance to the target object. With the transmit time method, a light pulse having the shortest possible pulse duration is emitted by the measurement device, then its transit time to the target object and back to the measurement device is determined, for instance. Based on this, the distance of the measurement device to the target object can be calculated, with reference to the known value for the speed of light.

With the phase measurement method, in contrast, the variation of the phase of the measurement signal with the path that was covered is used to determine the distance between the measurement device and the target object. Based on the magnitude of the phase displacement of the returning light in comparison to the emitted light, the path covered by the light and, therefore, the distance of the measurement device to the target object can be determined.

The field of application of distance measurement devices of this type generally includes distances in the range of a few millimeters up to many hundred meters. Depending on the paths to be measured, the environmental conditions and the reflectance of the selected target object, different requirements on the performance of a measurement device of this type result. Measurement devices of this type are now available commercially in compact designs; they enable simple, handheld operation for the user.

Laser distance measurement devices are known that have a defined measurement accuracy that is defined essentially by the measurement system on which the measurement device is based. This accuracy of the distance measurement device is guaranteed for a specified measurement range of the measurement device, by the manufacturer, for instance.

A circuit arrangement and a method for optical distance measurement is known from DE 198 11 550 A1, for example, with which at least two different, closely adjacent measurement frequencies are derived from an oscillator. To permit measurement over the greatest possible measurement range and, simultaneously, to obtain the highest possible measurement accuracy in the distance measurement, three different frequencies in the range from approximately 1 MHz to approximately 300 MHz are used in the method according to DE 198 11 550 A1, and the sought-after path is measured with each of these frequencies.

An optical method for measuring distances according to the pulse transit time method is known from EP 0 885 3999 B1, with which a rough measurement procedure and a fine measurement procedure are carried out. Using a rough measurement procedure, a measurement time interval is determined that is greater than an estimated propagation time of the light signal to and from the desired target object. An appropriate measurement time range is fixed in advance within this measurement time interval. A series of sub-measurements is then carried out during the fine measurement procedure, whereby, for each sub-measurement, a measurement light signal is sent to the target object and the received, returned light pulse that is reflected by the target object is collected only within the appropriate measurement time range that was fixed during the rough measurement procedure. The exact distance of the measurement device to the target object is then determined by calculating the mean of the individual measurements in the fine measurement procedure.

The object of the present invention is to expand, using simple means, the distance range—that is, the distance range across which a distance measurement can be carried out with the device—that is usable with a compact, and, in particular, handheld measurement device for distance measurement.

This object is attained via a device for distance measurement according to the invention and via a method for distance measurement.

SUMMARY OF THE INVENTION

In contrast to devices of the related art, the device according to the invention and/or the method according to the invention have the advantage that they enable distances to be measured with different measurement accuracies. If a measurement accuracy is guaranteed and, therefore, fixed, over a certain range of measurement distances, then this is a limiting criterium—due, e.g., to the decrease in signal intensity with the distance—for the measurement distance still to be determined with the predefined measurement uncertainty. The measurement uncertainty of a measurement is essentially determined by the signal-to-noise (S/N) ratio of the measurement signal. For small reflected signals, which occur when measurement distances are great or when a measurement is taken against surfaces with low reflectance, this results in a limitation of the measuring range which can be measured with a specified measurement uncertainty. If the measurement uncertainties with which a corresponding distance measurement is carried out are not fixed, but rather can be predetermined by the user or via an automatic procedure in the device, then the measurement range—which is accessible with a measurement device and/or, correspondingly, a method of this type—over which the distance measurements are possible can be markedly expanded, even if a higher measurement uncertainty must be tolerated.

For a large number of areas of application of a, e.g., handheld, compact distance measurement device, the advantages resulting from the expansion of the measurement range outweigh the possible disadvantages of greater measurement uncertainty and/or reduced measurement accuracy.

Advantageous further developments of the device indicated in the independent claims and/or the claimed method are possible due to the measures listed in the dependent claims.

The measurement inaccuracy of the measurement device may be optimally adapted to the particular measurement task in an advantageous manner. In many cases of the typical use of a compact distance measurement device of this type, high accuracy with a resolution in the range of a few millimeters is not required, for example. When measuring larger distances, in particular, it is desirable to first obtain a first measured value and starting point for the sought-after distance, so that, in this case, a determination of the sought-after distance with an accuracy of a few millimeters is not even required. Much too much measurement expenditure would be required to carry out distance measurements over a distance of a hundred or more meters with the same low level of measurement uncertainty as it would require to carry out a measurement over a few meters.

With the device for optical distance measurement according to the invention, it is advantageously possible to markedly expand the range of distances to be measured, in principle, with a device of this type. Instead of a fixed, predetermined measurement uncertainty of distance measurement and/or a corresponding resolution of the distance measured, a variable measurement uncertainty is made possible with the distance measurement carried out by the device. For example, the measurement distance of a distance measurement device of this type may be expanded markedly when the requirements on the measurement uncertainty of the value to be determined are reduced for the range of greater measurement distances, e.g., in the range of 50 to many hundred meters. Likewise, the measurement time needed to determine a measurement distance may be markedly reduced when the measurement uncertainty of the measurement system is raised accordingly for this purpose.

In advantageous fashion, a number of characteristic curves, e.g., characteristic curves that specify the course of the measurement uncertainty over a measurement distance, can be stored in a storage medium of the measurement device for this purpose.

Based on a target entered by the user, e.g., using a keypad on the device or via an automated system internal to the device, a characteristic curve can then be selected that specifies—as a function of the measurement distance—a measurement uncertainty on which the distance measurement is to be based.

For example, in an advantageous embodiment of the measurement device according to the invention and/or the method for distance measurement on which it is based, a maximum measurement time for a measurement can then be predetermined, and the device switches automatically between the available characteristic curves for the measurement uncertainty to select that characteristic curve—with consideration for the predetermined measurement time—which ensures the lowest possible measurement uncertainty.

In this manner, it is ensured that the minimum measurement uncertainty of the device is utilized in the range of small measurement distances and the measurement uncertainty does not gradually become greater until the distances are greater, so that an expanded measurement range is made available to the measurement device without the measurement uncertainty becoming too great in the range of small measurement distances.

In advantageous fashion, a value for the signal-to-noise ratio (S/N) of the returning amplitude signal to be detected can be specified to the control and evaluation unit of the device. This signal-to-noise ratio then essentially defines the accuracy with which a distance measurement is to be carried out.

In a likewise advantageous manner, the distance measurement device according to the invention is configurable such that the measurement time, the measurement uncertainty of the measurement and the resolution of the measured result are selectable individually or as a whole. A user of the measurement device according to the invention can enter a fixed measurement time or a desired accuracy for the distance measurement using an operating field, for example. The electronics in the measurement device then adjust, semi-automatically, the remaining measurement parameters via corresponding circuit means in such a manner that the desired measurement uncertainty and/or the desired measurement time are made possible.

The measurement device according to the invention can be set in this manner for a measurement uncertainty of $10^{-3}$ m, for example, for working at close range up to approximately 10 m on highly reflective surfaces, whereby the measurement time would amount to one second at most, for example, and the resolution of the measurement device should be $10^{-4}$ m. This setting may result in it being impossible to carry out a measurement on dark surfaces, which is irrelevant for the user's desired measurement situation anyway. The measurement device may also be configured optimally in a likewise advantageous manner for working at far range, e.g., between 50 m and 100 m, by reducing the accuracy of the measurements to $10^{-1}$ and setting the resolution of the determined measured value to $10^{-2}$ m.

In an exemplary embodiment of the measurement device according to the invention, a sensor is integrated that detects the light conditions in the environment of the measurement site and, based on this, determines a measure of the background signal that exists for a measurement. This background signal is incorporated in the signal-to-noise ratio that exists for a measurement and therefore influences the possible measurement uncertainty of a distance measurement. In an advantageous embodiment, this sensor function is performed by the detector element of the receive branch, so that the measurement signal and the background signal are both determined with only one detector.

An automatic switching over of the measurement uncertainty of the device based on the relative intensity of the ambient light can be predetermined in the method according to the invention and integrated accordingly in a measurement device that operates according to this method.

For example, the possible distance measurement range for a maximum predetermined measurement time can be expanded by reducing the requirements on the signal-to-noise ratio across the distance. When working outdoors in sunlight, i.e., with a strong background and/or noise signal, in particular, this results in a marked increase in the usability of the measurement device according to the invention.

Advantageously, only one measurement parameter (measurement time, resolution of the distance, measurement uncertainty, . . . ) can be fixed in the evaluation unit of the measurement device according to the invention, for example, so that the other measurement parameters are adjusted semi-automatically by the control electronics of the measurement device such that, given a fixed setting, e.g., the measurement time, the sought-after distance is determined with the best-possible accuracy, i.e., with minimal measurement uncertainty. This results in a depiction of the measured value that is adjusted for the resolution used, however.

The device for optical distance measurement according to the invention also makes it possible for the device to configure itself, independently and fully automatically, such that all parameters are adjusted such that an optimum setting of the measurement parameters is carried out depending on the distance and environmental conditions.

In an exemplary embodiment according to the invention, the value of the signal-to-noise ratio which determines the measurement accuracy is determined by a first "rough" measurement of the distance to the target object by the device itself, the rough measurement being carried out before the actual distance measurement. The subsequent, second measurement for determining the distance between the measurement device and the target object is then carried out with an accuracy and, therefore, measurement time requirement, that is adjusted to the rough distance range.

In an advantageous exemplary embodiment of the device according to the invention, various measurement uncertainties are set up for this purpose, which are allocated to individual distance intervals. Based on the approximate distance determined in the rough measurement, a measurement uncertainty for the actual distance measurement corresponding to this distance is then selected by the device.

It is also possible with the method according to the invention that the user himself specifies the resolution of the distance before a measurement by entering "mm", "cm", or "m" via an operating field, for example, and the measurement device selects an adjusted measurement uncertainty—with consideration for the measurement situation, that is, with consideration for the level of the background signal and the desired measurement time, for example—that is, it determines the signal-to-noise ratio up to which the measurement should be carried out. While the measurement is underway, the particular current signal-to-noise ratio is then determined by a control and evaluation unit of the measurement device, and a decision is made as to whether the measurement must be carried out for a longer period of time.

It is particularly advantageous when a plurality of characteristic curves is stored in the measurement device, which have a different course of measurement uncertainty with the measurement distance, so that, by selecting a characteristic curve of this nature, a measurement uncertainty that is still acceptable for a selected measurement range is selected.

This can also take place, for example, by a user roughly specifying an approximate distance range, and the device then selecting a corresponding, optimized characteristic curve for the measurement uncertainty.

In advantageous fashion, in the measurement device according to the invention, the setting for the accuracy of the length measurement on which a distance measurement is based is shown to the user via an optical display. For example, via a display of "millimeters", "centimeters", or "meters", the user can be informed immediately as to which magnitude the measured result appearing in the display for his length measurement can be specified in and be accurate.

In a further exemplary embodiment of the device according to the invention, the display of the measured results of a distance measurement can be depicted, for example, with the number of decimal places corresponding to the accuracy of the distance measurement, in a display device of the measurement device. The measurement accuracy, which decreases as the measurement distance increases, can be visualized for the user of the measurement device in a simple but unequivocal manner by reducing the display resolution, for example.

The method, according to the invention, for distance measurement with phase displacement of amplitude-modulated light makes it possible in a simple and advantageous fashion to markedly expand the length range for the distance measurement that is possible with a measurement device of this nature. As an alternative, the method according to the invention makes it possible to reduce the measurement time for a measurement given a typical, predetermined distance from a target object, for example. The measurement range that is accessible with the method for distance measurement according to the invention is no longer limited by a measurement accuracy that is specified once and applies across the entire measurement range and for all applications of the device; instead, it can be markedly expanded in simple fashion by adapting the measurement accuracy to the measurement task. The method according to the invention permits the area of application of a measurement device of this type to be expanded markedly.

Further advantages of the device according to the invention and/or the method according to the invention result from the drawings and the associated description.

BRIEF DESCRIPTION OF THE DRAWINGS

An exemplary embodiment of the device according to the invention and the method for optical distance measurement according to the invention are depicted in the drawing. The exemplary embodiment will be described in greater detail in the subsequent description. The figures in the drawing, their description, and the claims directed to the present invention contain numerous features in combination. One skilled in the art will also consider these features and/or the claims on which they are based them individually and combine them to form further reasonable combinations and claims.

DETAILED DESCRIPTION OF THE PREFERRED EMBODIMENTS

Figure 1:
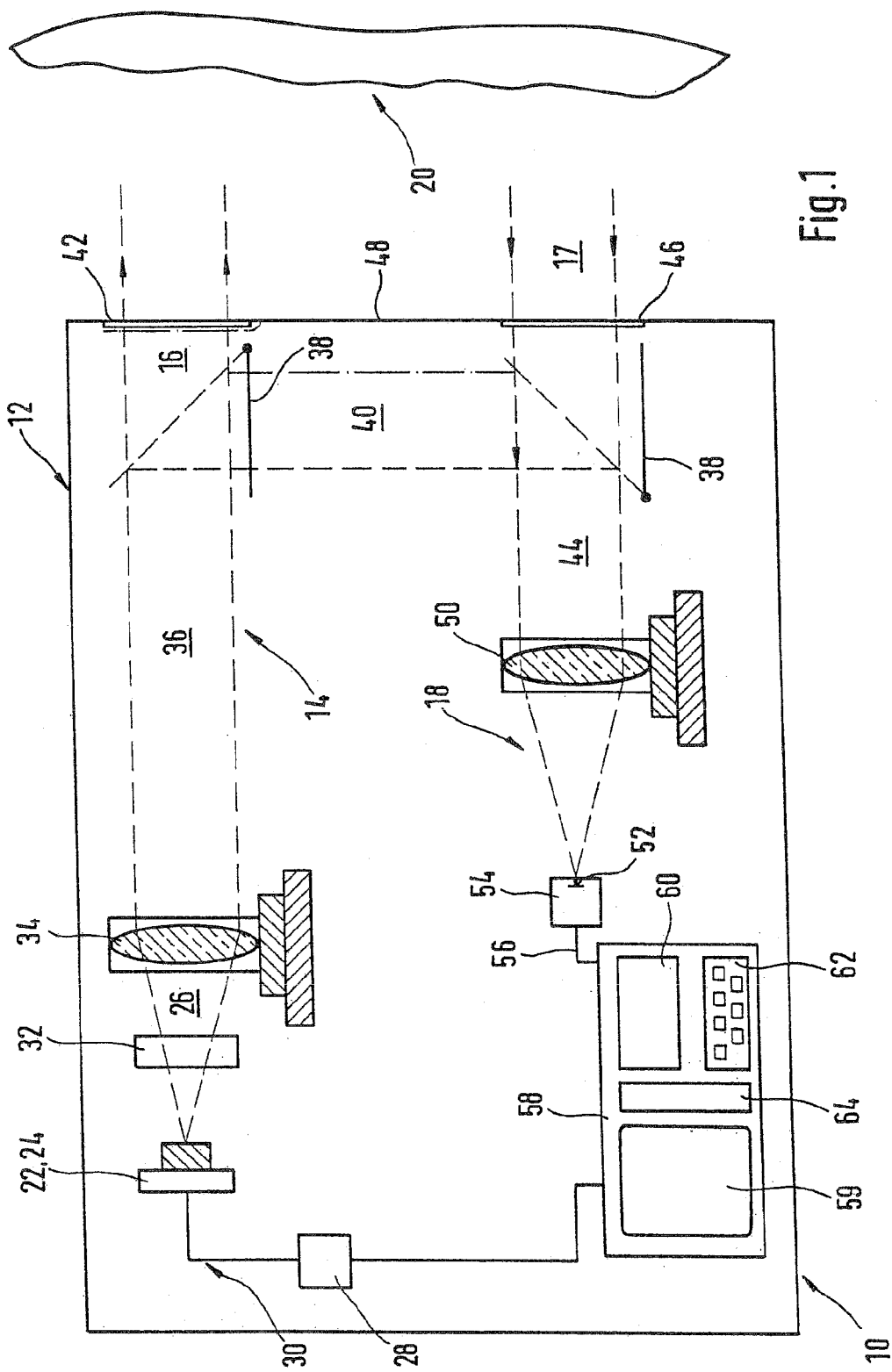
FIG. 1 shows a device according to the general class for optical distance measurement in a schematic total overview.

FIG. 1 shows, in schematic fashion, a distance measurement device 10 according to the general class with the most important components for describing its basic configuration. Device 10 has a housing 12 in which a transmission branch 14 for generating a measurement signal 16 and a receive branch 18 for detecting the measurement signal 17 returning from a target object 20 are located. Receive branch 18 forms a receive channel for returning measurement signal 17.

Transmit branch 14 contains a light source 22, which is realized in the exemplary embodiment in FIG. 1 by a semiconductor laser diode 24. The use of other light sources and non-optical transmitters in the device according to the invention is also possible.

Laser diode 24 in the exemplary embodiment according to FIG. 1 emits a laser beam in the form of a light bundle 26 that is visible to the human eye. Laser diode 24 is operated via a control device 28 which, using corresponding electronics, generates a modulation of the electrical input signal 30 to diode 24. Control device 28 receives the necessary frequency signals to modulate a control and evaluation unit 58 of the measurement device. In other exemplary embodiments, control device 28 can also be an integral component of the control and evaluation unit 58.

Control and evaluation unit 58 includes a circuit arrangement 59 which also includes, among other things, at least one quartz oscillator for providing the necessary frequency signals. The measurement signal is modulated in known fashion with these signals of which typically a plurality having different frequencies is used during a distance measurement. The principle configuration of a circuit arrangement of this type is described in publication DE 198 11 550 A1, for example, and will therefore not be explicitly repeated here.

Intensity-modulated light bundle 26 exiting from semiconductor diode 24 passes through first optics 32, which results in an improvement of the beam profile of the light bundle. Optics of this type can also be an integral part of the laser diode itself. Laser beam bundle 26 then passes through a collimation lens 34, which generates a nearly parallel light beam bundle 36 that is emitted in the direction of target object 20 to be measured. For this purpose, a device 38 for generating a reference distance 40 internal to the device is located in transmit branch 14 of the device according to FIG. 1, the reference distance serving as internal calibration of the measurement device.

Measurement signal 16 is coupled out of housing 12 of device 10 through an optical window 42. To perform a measurement, device 10 is directed at a target object 20, whose distance from the measurement device is to be determined. Signal 17, which is reflected or scattered on the desired target object 20, forms a returning measurement beam bundle 44, a certain portion of which enters device 10 again. Returning measurement beam 17 is coupled into the measurement device through an entry window 46 in end face 48 of device 10 and directed to a receiving lens 50. Receiving lens 50 bundles the returning measurement beam bundle 44 onto active surface 52 of a receive device 54.

This receive device 54 can be a junction-type detector or a photodiode, for example, and a direct-mixing avalanche photodiode of a known type, for example. Active surface 52 of receive device 54 is a corresponding detection element. Receive device 54 converts incoming light signal 17 into an electrical signal, which is then forwarded via corresponding connecting means 56 to a control and evaluation unit 58 of device 10. Control and evaluation unit 58 determines—based on returning optical signal 17 and, in particular, the phase displacement impressed on the returning signal in comparison with the signal sent originally—the sought-after distance between device 10 and target object 20, and displays it in an optical display device 60 of the measurement device, for example.

In the case of a laser distance measurement using phase-displacement measurement of amplitude-modulated light, the phase displacement between the light returning from target object 20 and received in detector 54 and the light emitted from measurement device 10 in the direction of target object 20 is given by the equation:

$$\varphi = \frac{2\pi * f}{c} * 2d \qquad (1)$$

Wherein $\varphi$ represents the phase displacement impressed on the light signal resulting from a distance d between measurement device 10 and target object 20, f represents the modulation frequency of the amplitude-modulated measurement signal, and c is the phase velocity (speed of light) of the measurement signal that is utilized.

The signal-to-noise ratio of the measurement signal that is used determines the accuracy in the determination of the distance d of measurement device 10 to target object 10 in the laser distance measurement using phase displacement measurement.

The measurement uncertainty $\Delta\varphi$ in a phase measurement is given by the equation:

$$\Delta\varphi = \frac{1}{\sqrt{2*\frac{S}{N}}} \qquad (2)$$

The signal-to-noise ratio S/N, which determines the measurement uncertainty, may be determined, for example, based on an amplitude measurement of the modulation signal and the direct component of ambient light that results in a corresponding noise in the measurement signal.

Since the signal-to-noise ratio can basically be measured, it is also possible according to the invention to influence a distance measurement such that a predetermined target value for the signal-to-noise ratio S/N and, therefore, for the measurement uncertainty $\Delta\varphi$ (p, is achieved in the phase measurement, e.g., by adjusting the measurement time. With the method according to the invention, the target signal-to-noise ratio to be achieved in a measurement can be set by the user indirectly in the form of a preselected measurement time, e.g., via an operating field 62 of the control and evaluation unit 58 of measurement device 10, or automatically or semi-automatically in optimized fashion by the measurement device itself.

Using a short distance measurement carried out before the actual measurement procedure, for example, an erroneous rough estimate of the sought-after distance can therefore be carried out, followed by a more exact measurement, which is carried out, however, with a requirement on the measurement uncertainty and, therefore, the signal-to-noise ratio S/N that is adjusted to the rough distance range.

A subset can also be selected from a series of distance measurements to adjust the measurement uncertainty, of the determined measurement distance, for example, based on these results. Since an increasing number of individual measurements, e.g., with different frequencies, is carried out to determine a distance, individual measurements of this type can be utilized to carry out information for adjusting measurement uncertainty. This means that the measurement uncertainty can also be adjusted and optimized during the determination of a distance of the measurement task.

As an alternative, the measurement range accessible by the measurement device can be expanded within a predetermined maximum measurement time by reducing the signal-to-noise ratio requirements across the distance. Especially in the outdoors with strong sunlight, which results in a raised noise level, this can result in a marked increase of the measurement distance that is possible with measurement device 10 according to the invention and, therefore, in an increase in the usability of the measurement device according to the invention. The accuracy of the distance measurement, which decreases as the distance increases, can be visualized and communicated to the user by reducing the resolution of the display of the measured results in display 60 of measurement device 10.

Figure 2:
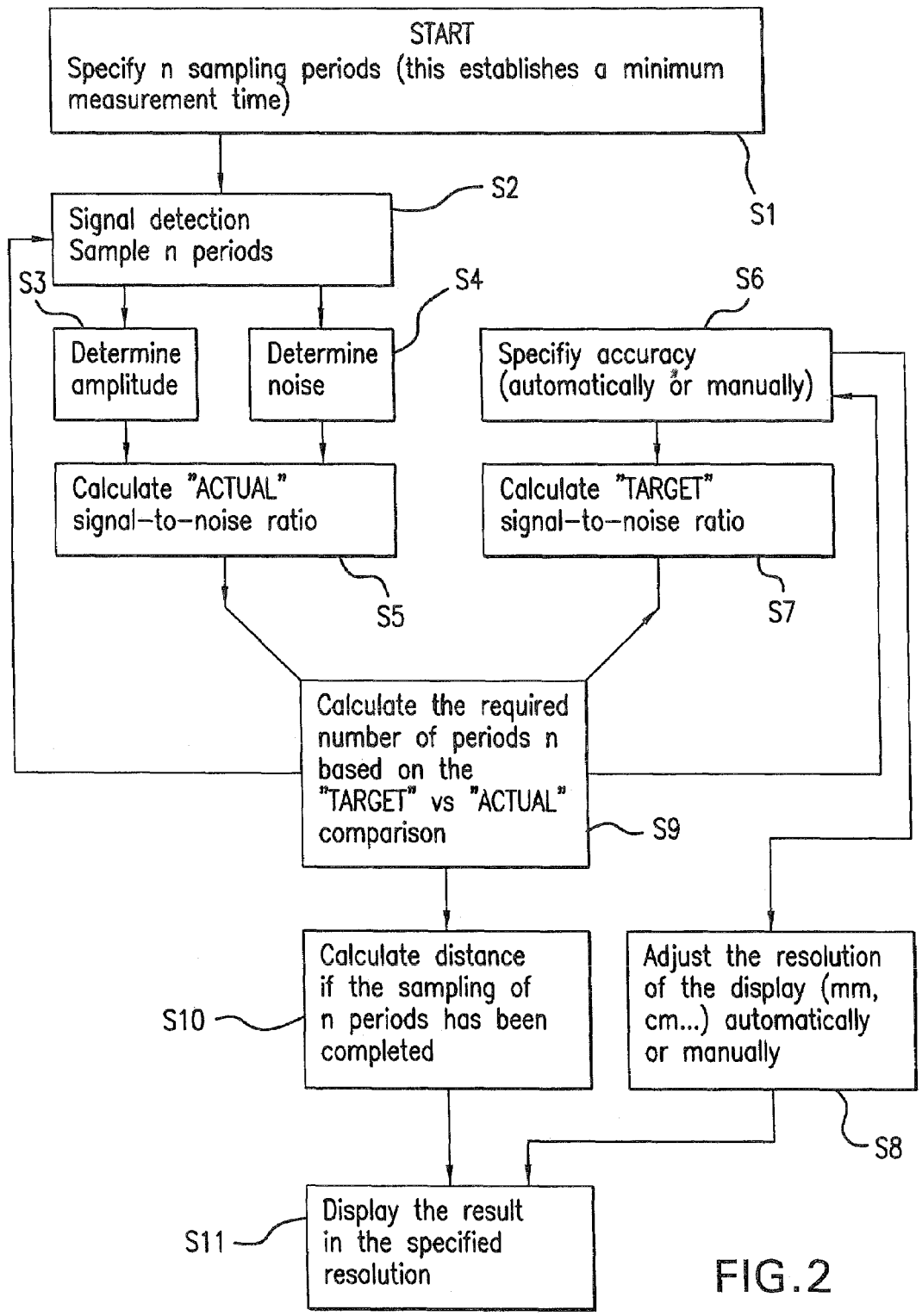
FIG. 2 is a flow chart with the essential method steps on which the method according to the invention is based.

FIG. 2 shows an exemplary embodiment of the essential steps of the method according to the invention using a flow chart of individual method steps.

At the beginning of the method, a measurement time for the upcoming distance measurement is defined in method step S1. It is translated inside the device into a target for the number n of sampling periods of the modulated measurement signal that are used by the evaluation unit to evaluate the measurement signal. The desired measurement time can be communicated to the measurement device and/or the evaluation unit of the measurement device manually by the user, e.g., via operating field 62, or automatically by a corresponding routine of the control and evaluation unit 58 of device 10.

After the measurement time is specified, a measurement is started, e.g., by actuating a corresponding "Start" button in operating field 62 of measurement device 10, a measurement signal 16 is emitted from the device in the direction of sighted target object 20, and measurement signal 17 reflected on target object 20 is detected by the measurement device. For known reasons and reasons cited in publication DE 198 11 550 A1, for example, it can be advantageous to repeat this measurement procedure with measurement signals having a different frequency. To simplify the further description of the method according to the invention, only the method for one frequency will be described below.

In method step S2, the amplitude-modulated measurement signal is detected and processed further in accordance with the previously selected measurement time over a period of n periods. In method step S3, the amplitude of the detected measurement signal is determined from the measurement signal arriving at receive detector 54 and, in a parallel or serial method step S4, the noise portion contained in the measurement signal is determined.

In method step S5 according to FIG. 2, the signal obtained from the amplitude determination is converted to a ratio with the noise portion determined in method step S4, thereby calculating the signal-to-noise ratio S/N on which the completed measurement is based.

In a method step S6, which is parallel to the measurement procedure, a desired, theoretical accuracy target is transmitted to the measurement device in the form of measurement uncertainty.

This can take place via manual input by the user before the actual measurement, or via an automatic or semi-automatic assignment by the measurement device itself. For example, the measurement device can also access a memory internal to the device, in which values for the measurement uncertainty are stored. These values can be stored as a function of distance ranges, for example, so that a smaller measurement uncertainty is used for a measurement in the range of 1 m to 3 m than in the range of 5 m to 20 m or in the range of 20 m to 100 m, for example. Various characteristic curves can also be stored in the measurement device itself, the characteristic curves reflecting the different functional interrelationships between the measurement uncertainty on which the measurement is based and the distance to be measured.

Based on the accuracy target in method step S6, i.e., based on the selected measurement uncertainty, the associated, necessary signal-to-noise ratio that must be adhered to to attain the measurement uncertainty according to method step S6 is calculated in method step S7.

By using appropriate sensors, the measurement uncertainty to be applied can be adapted to the environmental parameters. For example, an adjusted measurement uncertainty can be selected with consideration for the level of the background signal and the desired measurement time, i.e., a signal-to-noise ratio can be specified, up to which the measurement should be carried out. The environmental parameters do not necessarily have to be purely optical environmental parameters. Using appropriate sensors, for example, any other type of radiation, e.g., cell phone interference, radar signals or "electro smog", can be detected which could influence the signal-to-noise ratio. Using the control and evaluation unit of the device, the measurement uncertainty can then be set in a manner yet to be described.

At the same time, in method step S8, the resolution of display 60 of measurement device 10 is adjusted by the central control and evaluation unit 58 of measurement device 10 according to the invention to the accuracy target according to method step S6. For example, by reducing the number of decimal places in the depiction of the measurement results, the user can be informed as to which measurement accuracy or measurement uncertainty the completed measurement was based on.

It is also possible, for example, using corresponding operating buttons in operating field 62 of measurement device 10, to indicate the number of decimal places in the display, e.g, before a measurement, and thereby notify control and evaluation unit 58 directly as to which measurement uncertainty the subsequent distance measurement is to be carried out. The device can then also call up a stored characteristic curve, for example. It is also possible to specify to the device the distance range in which the subsequent distance measurement will be located, so that a corresponding measurement accuracy can be selected semi-automatically by the device.

A comparison is carried out in method step S9 between the desired "S/N target" signal-to-noise ratio according to method step S7 and the "S/N actual" signal-to-noise ratio on which the actual measurement is based. If the measured actual value of the signal-to-noise ratio does not correspond to the targets of the actual value according to method step S6, the measurement time required to reach the target value is calculated and, out of this, the required number of measurement periods n for the evaluation unit is determined. In this case, the method branches off back to method step S2, so that a renewed measurement with the now-adjusted measurement time is started and/or the on-going measurement is carried out or continued with the now-adjusted number of sampling periods.

If it should arise that the measurement time required for the corresponding distance measurement with the required measurement uncertainty is too great, or if a predetermined measurement time were exceeded, it is provided that the measurement device automatically rounds the measurement uncertainty up. In this case, the method branches back to method step S6, in which the measurement uncertainty is specified. The decision in method step S6 can then be made by selecting another characteristic curve of the measurement uncertainty as a function of the distance, or by specifying a fixed value for the measurement uncertainty. To this end, the measurement device according to the invention can also "scroll through" the individual characteristic curves of the measurement uncertainty in order to find the measurement uncertainty that just allows a measurement to be carried out in the desired measurement time.

If the measured "S/N actual" signal-to-noise ratio corresponds to the desired "S/N target" signal-to-noise ratio, the distance between the measured device and the target object is determined in method step S10 in known fashion based on the phase displacement determined over n periods of the modulated measurement signal. The method disclosed in publication DE 198 11 550 A1 can be used for distance measurement, for example.

In final method step S11, the distance between measurement device 10 and target object 20 determined by evaluation unit 58 is depicted in display 60 of measurement device 10, whereby to visualize the measurement uncertainty on which the measurement is based, the accuracy of the depicted distance value corresponds to the resolution of the corresponding predetermined measurement uncertainty.

The method according to the invention may be stored as a corresponding routine in the form of a control program, e.g., in control and evaluation unit 58 of a distance measurement device 10, so that an automatic or semi-automatic variation of the measurement uncertainty can also be carried out by the device itself, as a function of the measurement parameters. To this end, the corresponding characteristic curves can be stored in a storage medium and read out by the control and evaluation unit.

Figure 3:
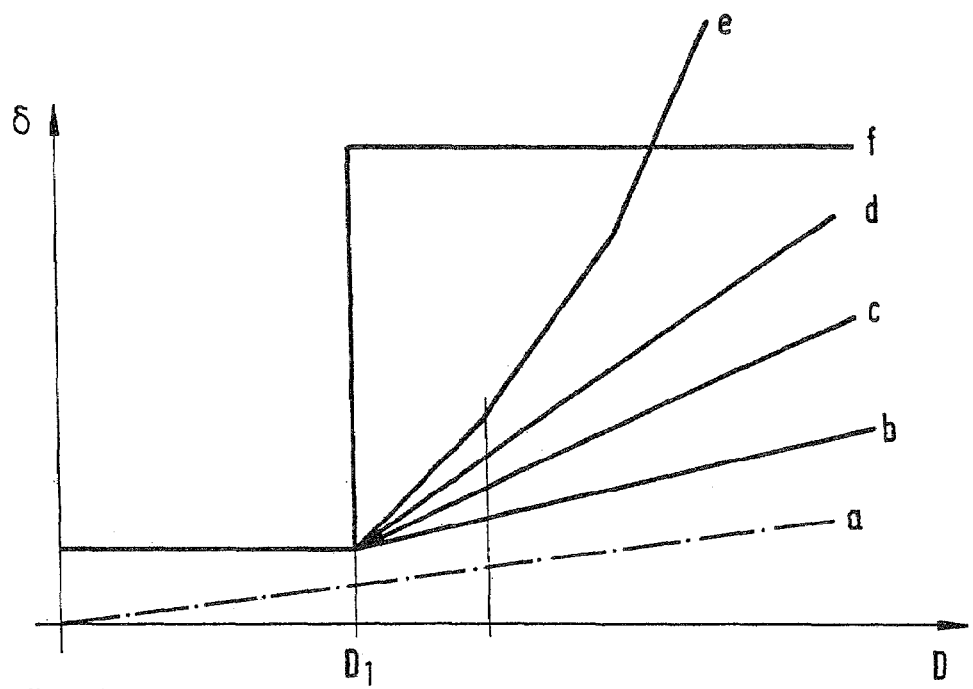
FIG. 3 shows the schematic course of the measurement uncertainty of a measurement device across the measurement distance, and a series of characteristic curves—which can be entered in advance in the device according to the invention—of the measurement uncertainty as a function of the measurement distance as examples.

FIG. 3 shows, in a schematic manner, various examples of curves for the measurement uncertainty δ on which a distance measurement is to be based, as a function of a measurement distance D. Curve a represents the measurement uncertainty that results alone based on the systematic error of the quartz oscillator that defines the measurement frequencies of the device. As indicated in equation (1), fluctuations in the frequency of the measurement signal also result in corresponding phase displacements in the signal that appear in errors for the distance to be determined therefrom and therefore contribute to measurement uncertainty. This measurement uncertainty reflected in curve a is therefore a measurement uncertainty that is internal to the device and can be optimized for the measurement device only by selecting qualitatively high-quality electronic components.

Curve b shows the measurement uncertainty that results when an additional statistical error is present due to a fixed signal-to-noise ratio S/N. Curve b therefore approximately reflects the minimum measurement uncertainty attainable with a measurement device as a function of measurement distance D.

Curves c, d, e and f show possible characteristic curves for the measurement uncertainty that can be stored in the device according to the invention. The characteristic curves can also have a non-linear function course and are not limited to the functional dependencies depicted in FIG. 3. When performing a distance measurement, measurement device can thereby successively "scroll through" these characteristic curves in order to not exceed a measurement time $T_0$ that may be predetermined. An optimization routine in the control and evaluation unit of the measurement device can then select that characteristic curve for a certain measurement distance that represents the optimal compromise between measurement time and measurement accuracy, with consideration for the measurement time required for this distance measurement.

Figure 4:
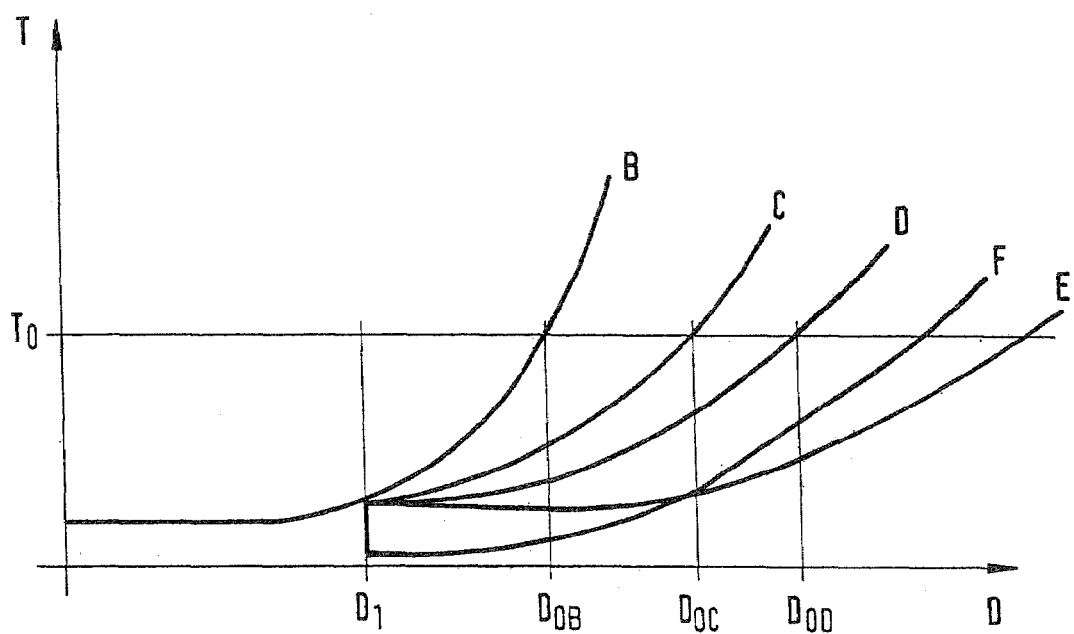
FIG. 4 shows the schematic course of the measurement time across the measurement distance in the case of an essentially constant measurement uncertainty and in the case of a measurement in accordance with the predetermined characteristic curves according to FIG. 3.
Figure 5:
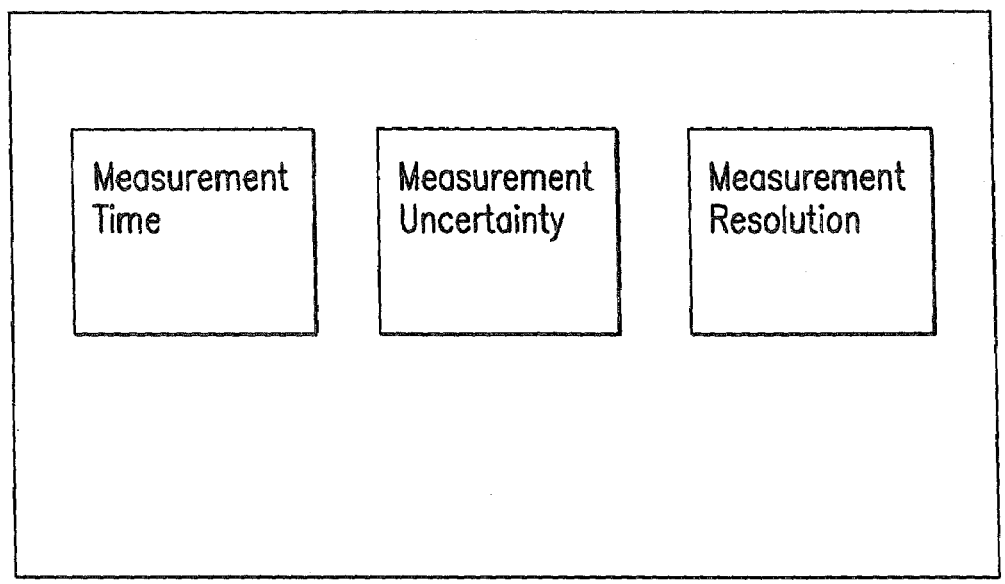
FIG. 5 schematically represents one example of a collection, that is, a "group" or "set", of measurement parameters.

FIG. 4 shows, also in a simplified, schematic representation, the measurement times B through E—corresponding to characteristic curves b through e in FIG. 3—as a function of the measured distance D. It is clear to see that the distance range $D_0$ yet to be measured over a certain measurement time $T_0$ can be markedly expanded by the selection, that is, by the free specification of a measurement uncertainty to the device by the device itself. The measurement uncertainty which can be specified to the device can also be located markedly above the measurement uncertainty that is specified as being conditional upon the device, as shown in FIG. 3, for example.

The method according to the invention and the corresponding device according to the invention therefore make it possible to expand the distance range usable with a measurement device for distance measurement, that is, that distance range across which a distance measurement can be carried out with the device, using simple means.

The method according to the invention and the device according to the invention for carrying out this method are not limited to the exemplary embodiments depicted in the description.

In particular, the method according to the invention and the corresponding measurement device for carrying out the method are not limited to the use of a phase measurement principle. Distance measurement devices that function according to the transit time principle, for example, can also make use of the method according to the invention.

Furthermore, the method according to the invention is not limited to use in optical distance measurement devices. The method according to the invention can also be used in ultrasound devices for distance measurement.

What is claimed is:

1. A device for distance measurement, with at least one transmitting branch (14) with at least one transmitter (22, 24) for emitting a modulated measuring beam (16, 26, 36) in the direction of a target object (20), and with at least one receive branch (18) for receiving the measurement radiation (17, 44) returning from the target object (20), and with a control and evaluation unit (28, 58) for determining the distance of the device to the target object (20), wherein the device has control means that enable a measurement of distances with predetermined measurement uncertainties.

2. The device as recited in claim 1, wherein the control means are configured such that the measurement uncertainty on which a distance measurement is based is adjustable as a function of at least one of the measurement distance to the target object (20) and of the measurement time of the distance measurement.

3. The device as recited in claim 1, wherein the device includes a storage medium (64) in which the measurement uncertainty on which a distance measurement is based is stored in the form of data.

4. The device as recited in claim 3, wherein the storage medium includes a plurality of characteristic curves for the measurement uncertainty which can be called up for a distance measurement using operating elements (62) on the measurement device.

5. The device as recited in claim 3, wherein the storage medium (62) includes a plurality of characteristic curves for the measurement uncertainty which can be called up selectively or successively for a distance measurement by the control and evaluation unit (28, 58) of the measurement device.

6. The device as recited in claim 1, wherein the device includes control means that permit the measurement uncertainty on which a distance measurement is based to be set by providing a default signal-to-noise ratio to the control and evaluation unit (28, 58) of the device.

7. The device as recited in claim 6, wherein the device includes control means that allow the value of the signal-to-noise ratio to be attained in a measurement procedure to be specified to the device before the a measurement procedure.

8. The device as recited in claim 6, wherein the device includes control means that allow at least one measurement parameter from a group of parameters that includes at least the measurement time of the device for a distance measurement and the measurement uncertainty of the device for a distance measurement to be quantitatively preselected by the user of the device so that the other measurement parameters of this group can be adjusted semi-automatically using the electronics of the measurement device such that a predeterminable value of a signal-to-noise ratio of a measurement variable is achieved in a measurement procedure.

9. The device as recited in claim 6, wherein the device includes control means that allow a set of parameters that contains at least the measurement time for a distance measurement using the device and the measurement uncertainty of the device for a distance measurement to be adjusted fully automatically for the particular measurement distance and/or the environmental conditions, in particular for the reflectance of a target object and/or the intensity of the ambient light such that a predetermined value of a signal-to-noise ratio is achieved in a distance measurement.

10. The device as recited in claim 6, wherein the device includes control means that enable the predetermined limiting value of the signal-to-noise ratio for a distance measurement to be determined by a first measurement of the distance—carried out before the actual distance measurement—with increased measurement uncertainty.

11. The device as recited in claim 6, wherein the device includes control means that make it possible for the predetermined limiting value of the signal-to-noise ratio for a distance measurement to be obtained based on partial results of a series of distance measurements.

12. The device as recited in claim 1, wherein the device includes an output unit that makes it possible to reproduce at least one of the measurement uncertainty used in a distance measurement and the distance resolution of the device.

13. The device as recited in claim 1, wherein the device includes an output unit that makes the measured result of a distance measurement depictable with the number of decimal places of the measured value of the distance corresponding to the measurement uncertainty.

14. The device as recited in claim 1, wherein the transmitter of the device includes at least one light source (22).

15. A method for distance measurement, with which at least one transmitting branch (14) of a measurement device (10) emits a modulated measuring beam (16, 26, 36) in the direction of a target object (20), the measuring beam (17, 44) reflected by the target object (20) and returning is detected in the measurement device (10), and the distance of the measurement device (10) to the target object (20) is capable of being determined based on the reflected measurement signal, wherein the particular value of the measurement uncertainty on which a measurement of the distance to a target object is to be based, is capable of being specified to the measurement device.

16. The method for distance measurement as recited in claim 15, wherein the value for the measurement uncertainty on which a distance measurement is to be based is capable of being set as a function of at least one of the measurement distance to the target object (20) and of the measurement time of the distance measurement.

17. The method for distance measurement as recited in claim 15, wherein the value of the measurement uncertainty on which a distance measurement is to be based takes place by providing a target value for a signal-to-noise ratio to be attained in a measurement procedure.

18. The method for distance measurement as recited in claim 17, wherein the predetermined limiting value of the signal-to-noise ratio for a distance measurement is determined via a first measurement of the distance—carried out before the actual distance measurement—with increased measurement uncertainty.

19. The method for distance measurement as recited in claim 17, wherein the predetermined limiting value of the signal-to-noise ratio for a distance measurement is obtained based on partial results of a series of distance measurements.

20. The method for distance measurement as recited in claim 19, wherein the value for the measurement uncertainty on which a distance measurement is to be based is optimized by selecting a characteristic curve stored in the device.

21. The method for distance measurement as recited in claim 15, wherein the value for the measurement uncertainty, on which a distance measurement is to be based, is stored in the measurement device in the form of one or more characteristic curves and can be at least one of called up selected automatically by the device and called up by the user of the device.

22. The method for distance measurement as recited in claim 21, wherein the value for the measurement uncertainty on which a distance measurement is to be based is optimized by specifying a maximum measurement time for the distance measurement by selecting a characteristic curve (a, b, c, d, e, f) for the measurement uncertainty.

23. The method for distance measurement as recited in claim 15, wherein the value for the measurement uncertainty is increased incrementally during the distance measurement until the distance measurement is possible in a predetermined period of time.

* * * * *